United States Patent
Jain et al.

(10) Patent No.: US 10,798,538 B2
(45) Date of Patent: Oct. 6, 2020

(54) ASSET FLOOR MAP

(71) Applicant: BMC SOFTWARE, INC., Houston, TX (US)

(72) Inventors: Priyanka Jain, Fairfield, CT (US); Sameer Mardhekar, Pune (IN); Anand Bhagwat, Pune (IN)

(73) Assignee: BMC Software, Inc., Houston, TX (US)

(*) Notice: Subject to any disclaimer, the term of this patent is extended or adjusted under 35 U.S.C. 154(b) by 0 days.

(21) Appl. No.: 15/476,573

(22) Filed: Mar. 31, 2017

(65) Prior Publication Data
US 2018/0249298 A1    Aug. 30, 2018
US 2020/0137527 A9    Apr. 30, 2020

(30) Foreign Application Priority Data

Jan. 20, 2017  (IN) .............................. 201741002224

(51) Int. Cl.
| | | |
|---|---|---|
| *H04W 4/33* | (2018.01) | |
| *H04W 4/80* | (2018.01) | |
| *H04W 4/02* | (2018.01) | |
| *H04W 84/12* | (2009.01) | |
| *H04L 29/08* | (2006.01) | |

(Continued)

(52) U.S. Cl.
CPC .......... *H04W 4/33* (2018.02); *G06K 9/00362* (2013.01); *G06K 9/00771* (2013.01); *G06K 9/6267* (2013.01); *H04L 67/02* (2013.01); *H04L 67/18* (2013.01); *H04W 4/023* (2013.01);

(Continued)

(58) Field of Classification Search
CPC ........ H04W 4/043; H04W 84/12; H04L 67/18
See application file for complete search history.

(56) References Cited

U.S. PATENT DOCUMENTS 6,278,940 B1    8/2001  Endo
6,353,445 B1    3/2002  Babula et al.
(Continued)

FOREIGN PATENT DOCUMENTS

EP    2926576 B1    9/2016
EP    2918085 B1    11/2016
(Continued)

OTHER PUBLICATIONS

Abowd et al., "Cyberguide: A Mobile Context-Aware Tour Guide", Baltzer Journals, Sep. 23, 1996, pp. 1-21.
(Continued)

*Primary Examiner* — Muthuswamy G Manoharan
(74) *Attorney, Agent, or Firm* — Brake Hughes Bellermann LLP

(57) ABSTRACT

A method includes receiving a floor map indicating a layout of a location, displaying at least a portion of the floor map, capturing signal strength data representing a signal field for at least one position on the floor map, identifying an asset within the layout of the location, determining at least one property that identifies the asset using one of a discovery process using a wireless protocol and an image processing application programming interface (API) configured to classify an image and detect individual within the image, updating the floor map with the asset and the at least one property, and communicating the asset and the at least one property to the remote computing device.

18 Claims, 10 Drawing Sheets

(51) Int. Cl.
*G06K 9/00* (2006.01)
*G06K 9/62* (2006.01)

(52) U.S. Cl.
CPC .............. *H04W 4/80* (2018.02); *H04L 67/12* (2013.01); *H04W 84/12* (2013.01)

(56) References Cited

U.S. PATENT DOCUMENTS

| | | |
|---|---|---|
| 8,589,069 B1 | 11/2013 | Lehman |
| 9,261,372 B2 | 2/2016 | Cline et al. |
| 9,534,903 B2 | 1/2017 | Cline et al. |
| 9,631,934 B2 | 4/2017 | Cline et al. |
| 2005/0251331 A1 | 11/2005 | Kreft |
| 2007/0192486 A1 | 8/2007 | Wilson et al. |
| 2008/0109718 A1 | 5/2008 | Narayanaswami |
| 2008/0263199 A1 | 10/2008 | Maki et al. |
| 2009/0043504 A1* | 2/2009 | Bandyopadhyay .... G01C 17/38 701/469 |
| 2009/0174546 A1* | 7/2009 | Lian .......................... G01S 5/12 340/539.1 |
| 2009/0315995 A1 | 12/2009 | Khosravy et al. |
| 2010/0070055 A1 | 3/2010 | Kennedy et al. |
| 2010/0121567 A1 | 5/2010 | Mendelson |
| 2010/0157848 A1 | 6/2010 | Das et al. |
| 2010/0172251 A1 | 7/2010 | Adam et al. |
| 2010/0229113 A1* | 9/2010 | Conner .................. G06Q 10/10 715/771 |
| 2010/0253507 A1 | 10/2010 | Jung et al. |
| 2010/0309897 A1 | 12/2010 | Harris et al. |
| 2011/0007901 A1 | 1/2011 | Ikeda et al. |
| 2011/0037712 A1 | 2/2011 | Kim et al. |
| 2011/0099490 A1 | 4/2011 | Barraclough et al. |
| 2012/0039316 A1 | 2/2012 | Park et al. |
| 2012/0075068 A1 | 3/2012 | Walker et al. |
| 2012/0096147 A1 | 4/2012 | Sakamoto |
| 2012/0313963 A1 | 12/2012 | Chen-Quee et al. |
| 2012/0316963 A1 | 12/2012 | Moshfeghi |
| 2013/0035110 A1 | 2/2013 | Sridhara et al. |
| 2013/0145293 A1 | 6/2013 | Yoakum et al. |
| 2013/0184012 A1 | 7/2013 | Gupta et al. |
| 2013/0262223 A1 | 10/2013 | Catane et al. |
| 2014/0087770 A1 | 3/2014 | Cho et al. |
| 2014/0111520 A1* | 4/2014 | Cline .................... G06T 11/206 345/440 |
| 2014/0113559 A1 | 4/2014 | Cline et al. |
| 2014/0114931 A1 | 4/2014 | Cline et al. |
| 2014/0365121 A1 | 12/2014 | Cline et al. |
| 2014/0365489 A1 | 12/2014 | Cline et al. |
| 2016/0316342 A1* | 10/2016 | Narasimhan ......... H04B 17/318 |
| 2017/0064497 A1* | 3/2017 | Thomas .................. H04W 4/02 |
| 2017/0134606 A1 | 5/2017 | Kim et al. |
| 2017/0177620 A1* | 6/2017 | Zhang .................. H04W 4/027 |
| 2017/0205239 A1 | 7/2017 | Cline et al. |
| 2017/0228689 A1* | 8/2017 | Brady ................ G06Q 10/0631 |

FOREIGN PATENT DOCUMENTS

| | | |
|---|---|---|
| EP | 2912861 B1 | 2/2017 |
| EP | 3203762 A1 | 8/2017 |
| WO | 2014/066342 A1 | 5/2014 |
| WO | 2014/066346 A1 | 5/2014 |
| WO | 2014/066347 A1 | 5/2014 |
| WO | 2016003108 A1 | 1/2016 |

OTHER PUBLICATIONS

First Examination Report for Australian Application 2013334804, dated Sep. 14, 2016, 2 pages.
First Examination Report for Australian Application 2013334808, dated Sep. 14, 2016, 2 pages.
Notice of Acceptance for Australian Application 2013334808, dated Jun. 9, 2017, 3 pages.
First Examination Report for Australian Application 2013334809, dated Sep. 5, 2016, 2 pages.
Extended European Search Report for European Application 17153791.3, dated Jun. 28, 2017, 7 pages.
Office Action received in European Application No. 13784101.1, dated Oct. 21, 2015, 4 pages.
Office Action received in European Application No. EP13784102.9, dated Oct. 21, 2015, 4 pages.
Office Action received in European Application No. 13784102.9, dated May 10, 2016, 4 pages.
Office Action received in European Application No. 13795322.0, dated Oct. 21, 2015, 4 pages.
International Search Report and Written Opinion received for International Application No. PCT/US2013/066107, dated Feb. 17, 2014, 9 pages.
International Search Report and Written Opinion received for International Application No. PCT/US2013/066112, dated Feb. 17, 2014, 9 Pages.
International Search Report and Written Opinion received for International Application No. PCT/US2013/066113, dated Feb. 17, 2014, 9 pages.
International Search Report and Written Opinion for Application No. PCT/US2018/014460, dated Jun. 14, 2018, 16 pages.
Communication pursuant to Article 94(3) EPC for European Application No. 18716387.8, dated Jul. 13, 2020, 8 pages.

* cited by examiner

ASSET FLOOR MAP

RELATED APPLICATION

This application claims priority to application no. TEMP/ E-1/2254/2017-CHE, filed in India on Jan. 20, 2017, the contents of which is incorporated herein by reference.

FIELD

Embodiments relate to asset management, and more specifically to the tagging and use of physical objects or locations.

BACKGROUND

Typically a company or sufficiently large organization has shared resources or assets that various people use. In some instances those shared resources may include things or physical objects, such as, for example copiers, printers, fax machines, traveler's workstations or computers (e.g., an unassigned computer available for use by travelling or transient workers), refrigerators, coffee makers, and the like. In some instances those shared resources may include locations, such as, for example, conference rooms, traveler's workstations or hot desks (i.e., an unassigned office space available to travelling or transient workers), break rooms, and the like.

Often times, it may be difficult someone to locate these shared resources, particularly if one is visiting a corporate site that one does not often visit or has never been to. For example, a worker might work at a company's Austin site but when that worker visits the company's San Jose site, they may find it difficult to locate usable office space, or printers, etc. Frequently, even if such a resource is found (e.g., an empty desk) such a worker may not even know if they are allowed to use the resource. It may be embarrassing for the worker to sit down at and begin to use an empty desk only to find out that the desk is reserved for someone else. Alternately, it may be frustrating to attempt to use a printer only to find out that the printer is out of order and that the search for a new printer must begin again. Other irritations and issues may arise when attempting to use shared resources.

In some case, even when a desired shared resource is located, there might be additional steps or actions that may need to be performed or additional resources may need to be located in order to use the resource. For example, a worker might need instructions on using the video or presentation equipment. In another example, even though a working printer has been found, the printer paper supply might be low or empty and the worker may need to locate more paper.

Likewise, often local or non-traveling employees, members of the organization, or guests, have a similar need of need to know if a desired resource is available or functional. Traditionally, a worker would have to physically go to the resource or location and find out it may or may not be available or functional. For example, to see if a conference room is available, one needs to travel to actual conference room and look to see if anyone is using it. Such a traditional scheme costs valuable time and has the disadvantage of not always being accurate (e.g., a conference room may be reserved but the reserver may simply be late, leading the worker to incorrectly view the empty conference room as available when it is not, etc.).

For Information Technology (IT) Field Support personnel (e.g., Technicians, Asset Managers, and the like), the process of building a floor map by discovering, identifying and pinning the asset at appropriate location on the floor map, is very time consuming and requires many manual steps. Also, because floor map building is a manual process, the location can be based on approximations and/or be error prone. The number of assets on a floor has grown substantially (e.g., with bring your own device (BYOD) organizations). In addition, the location of devices can change on a regular or random basis (e.g., daily, weekly, as a user moves hot desks, and the like). Therefore, keeping the visual floor map up-to-date is a significant challenge for IT personnel.

Similarly for and end user, locating a required asset (e.g., a specific printer), finding all useful assets within a periphery (e.g., a video conferencing room or board room) and finding live statuses of assets can be a fairly non-intuitive process without an up-to-date visual floor map.

SUMMARY

Example embodiments describe systems and methods to identify and locate assets and to generate a visual asset floor map.

In a general aspect, a non-transitory computer readable storage medium including executable code that, when executed by a processor, is configured to cause the processor to perform steps and a method to perform the steps including receiving, from a remote computing device, a floor map indicating a layout of a location, displaying, via a display interface of a client device, at least a portion of the floor map, capturing, using an application of the client device, signal strength data representing a signal field for at least one position on the floor map, identifying an asset within the layout of the location, determining at least one property that identifies the asset using one of a discovery process using a wireless protocol and an image processing application programming interface (API) configured to classify an image and detect individual within the image, updating the floor map with the asset and the at least one property, and communicating the asset and the at least one property to the remote computing device.

Implementations can include one or more of the following features. For example, the location is can be floor of a building. The signal strength data representing the signal field can be based on a magnetic field footprint captured using a Magnetic Indoor Positioning protocol. The signal strength data representing the signal field can be based on a WIFI signal footprint captured using a captured using a WIFI Indoor Positioning protocol. The asset can be a smart device, and the identifying of the asset can include detecting a communications protocol signal transmitted from the asset. The asset can be a smart device, and the determining of at least one property that identities the asset includes determining a position of the asset on the floor map can include determining a position of the client device on the floor map using an Indoor Positioning System (IPS) protocol, measuring a channel frequency and a signal strength using the wireless protocol, and using a formula based on a free-space path loss (FSPL), the channel frequency and the signal strength to determine a distance between the client device and the asset.

The asset may not be smart device, and the identifying of the asset includes capturing an image of the asset, using the image processing API to communicate the image to an external tool configured to identify an object using the image, and receive an asset class associated with the asset from the external tool. The asset may not be a smart device, and the determining of at least one property that identifies the asset includes determining a position of the asset on the floor map including determining a position of the client device on the floor map using an Indoor Positioning System (IPS) protocol, and measuring an inclination between at least two heights associated with the asset and use a trigonometric function and the inclination to determine a distance between the client device and the asset.

In another general aspect, a method includes receiving, from a client device, a request for a floor map based on a floor of a building, the floor map indicating a layout of the floor of the building, in response to receiving the request for the floor map, selecting a floor map from a database configured to store a plurality of maps, communicating the floor map to the client device, receiving, from the client device, information related to an asset, the information including at least one properly that identifies the asset and a position of the asset on the floor map, in response to receiving the information related to the asset, update a database configured to store data related to a plurality of assets, generating an annotated floor map based on the asset and the information related to the asset, and communicating the annotated floor map to the client device.

Implementations can include one or more of the following features. For example, the annotated floor map includes an icon representing the asset and an indicator, the icon representing the asset is located on the floor map at the position of the asset, and the indicator is located on the floor map at the position of the asset and indicates at least one of a type of the asset and a status of the asset. The discovering linkages to characteristics of the asset, and adding the linkages for the asset to the database configured to store data related to the plurality of assets. The update of the database configured to store data related to the plurality of assets includes one of determining whether a record associated with the asset exists upon determining a record associated with the asset exists, update the record using the information related to the asset, and upon determining a record associated with the asset does not exist, generate a new record using the information related to the asset.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
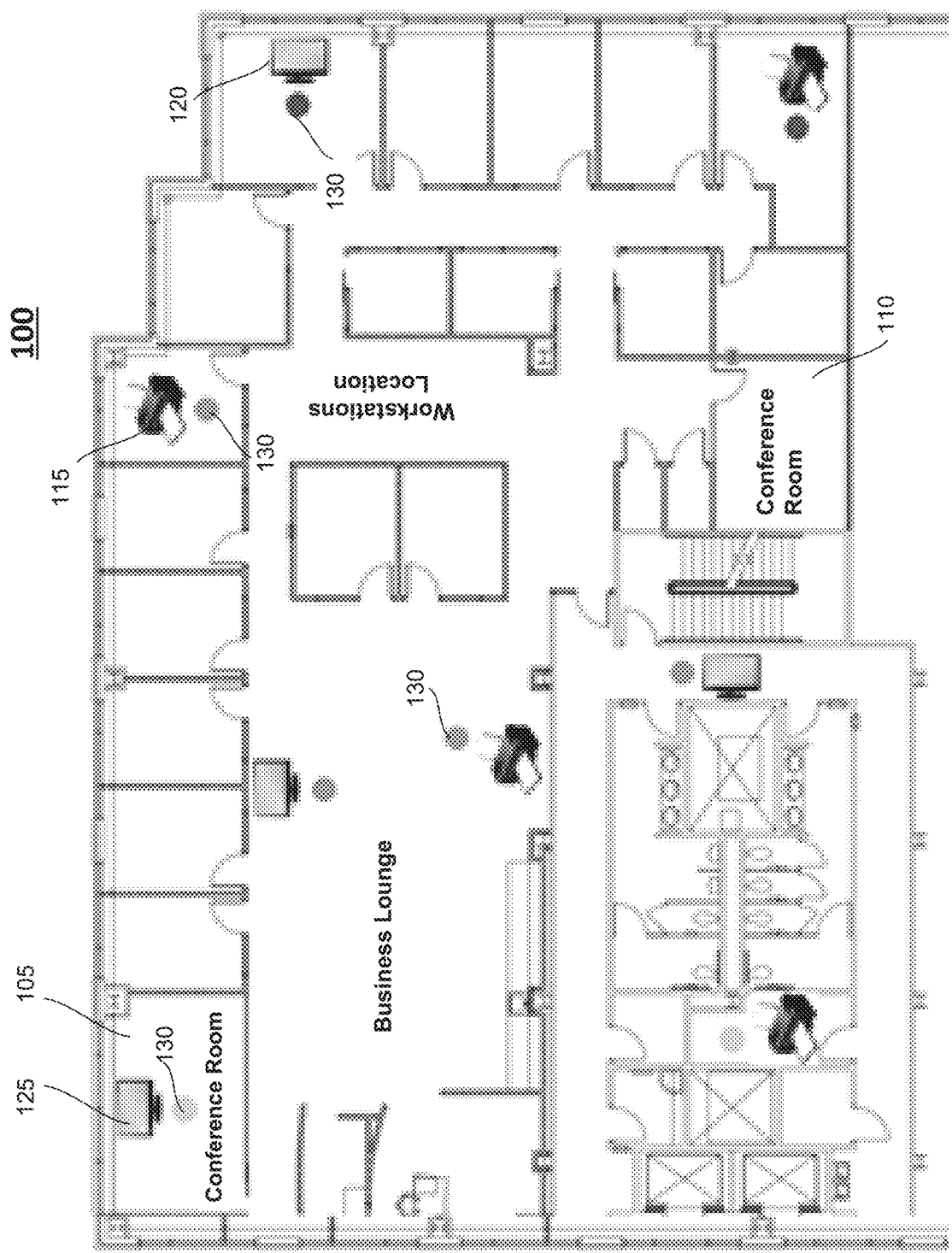
FIG. 1 illustrates a floor map according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives.

The digital workplace is expected to be a live and dynamic workplace where both Information Technology (IT) Field Support personnel and end users can be expected to work in a smart and intuitive environment. Example embodiments describe an automated technique for generating a visual asset floor map by (1) automatically identifying locations of smart (e.g., Internet of Things (IoT) enabled) devices on a floor map, (2) providing an intuitive technique for identifying location of non-Smart devices on the floor map, (3) identifying and classifying an asset type of non-Smart devices using techniques based on image and/or pattern recognition, and (4) using a crowd-sourced model to keep the floor map live and up-to-date in terms of device location and/or status. Smart devices, IoT enabled devices, non-Smart devices, assets and the like can also be referred to as points of interest (PoI) as well. A PoI can be a device (e.g., printer, computer, television, and/or the like) and/or a location (e.g., conference room, break room, rest room and/or the like).

FIG. 1 illustrates a floor map according to at least one example embodiment. As shown in FIG. 1, the floor map 100 can include at least one PoI or asset (hereinafter referred to as an asset) 105, 110, 115, 120, 125. For example, asset 105 and 110 are illustrated as a conference room, asset 120 and 125 are illustrated as a display (e.g., a television, a computer monitor and the like), and asset 115 is illustrated as a printer. Each asset 105, 110, 115, 120, 125 is illustrated as having an associated status indicator 130. Status indicator 130 can be configured to illustrate a status of the associated asset 105, 110, 115, 120, 125. The status indicator 130 can be color coded. For example, a red status indicator can indicate the asset 105, 110, 115, 120, 125 is not available and/or not operational. A yellow status indicator can indicate the asset 105, 110, 115, 120, 125 is available, but not operating properly. A green status indicator can indicate the asset 105, 110, 115, 120, 125 is available and operating properly. The status indicator 130 can also be a callout box including text with status and other information about the asset 105, 110, 115, 120, 125. Example implementations can include other colors and or other mechanisms for displaying text to show status of an asset 105, 110, 115, 120, 125.

According to example embodiments, the floor map 100 can be generated and populated with any number of assets (e.g., hardware, network devices, equipment, rooms, and the like). The floor map 100 can be dynamic (e.g., assets can be added, removed and/or relocated). Therefore, the floor map 100 can be updated in real time (e.g., a live map) as the floor map 100 updates itself after every usage (e.g., each time an end user interacts with the map and/or as IT personnel perform an build/rebuild operation). For example, an application operating on a computing device (e.g., desktop, laptop, and/or mobile device) can refresh a display showing the floor map 100 regularly (e.g., on a configured time interval) or as the floor map 100 (e.g., data associated with the floor map 100) is updated or changes.

An example method uses various combinations of techniques to auto-generation of the floor map 100. The techniques can include at least one of (1) after discovering a smart device using IoT protocols, a position can be found on the map based on a combination of IPS (Internal Positioning System) that may work within buildings where GPS does not and Trilateration of the devices positions based on signal strength (e.g., WIFI, near field technologies, and the like), (2) position detection of non-smart devices (e.g., devices that are not IoT) using a combination of IPS and camera measure techniques e.g., to locate the distance and angle of the device), (3) use a machine learning technique to determine an asset class of the device and then helps build linkages within a configuration management database (CMDB) by recommending a mapping to a configuration items (CI) within the CMDB, (4) use crowd-sourcing to build exact positions more accurately, to keep the map up-to-date in real-time and to keep the floor maps more accurate with respect to asset positions and status, and (5) end users can view assets on the map dynamically based on the assets current location, thus improving a user experience.

Accordingly, example embodiments can solve and/or help solve many use cases related to floor maps. For example, at least one example implementation can (1) discover an asset in real-time and pin the asset on the floor map 100, (2) keep a CMDB up-to-date using smart device techniques (e.g., IoT techniques), (3) keep the floor map up-to-date using crowd-sourcing or keep the floor map up-to-date without using expensive (e.g., in human resources) and/or time consuming data entry effort on part of an IT organization, (4) search for an asset and find directions (e.g., routes within a building) to the asset on the floor map 100, and (5) provide an up-to-date status and location of the asset to the end users.

Figure 2B:
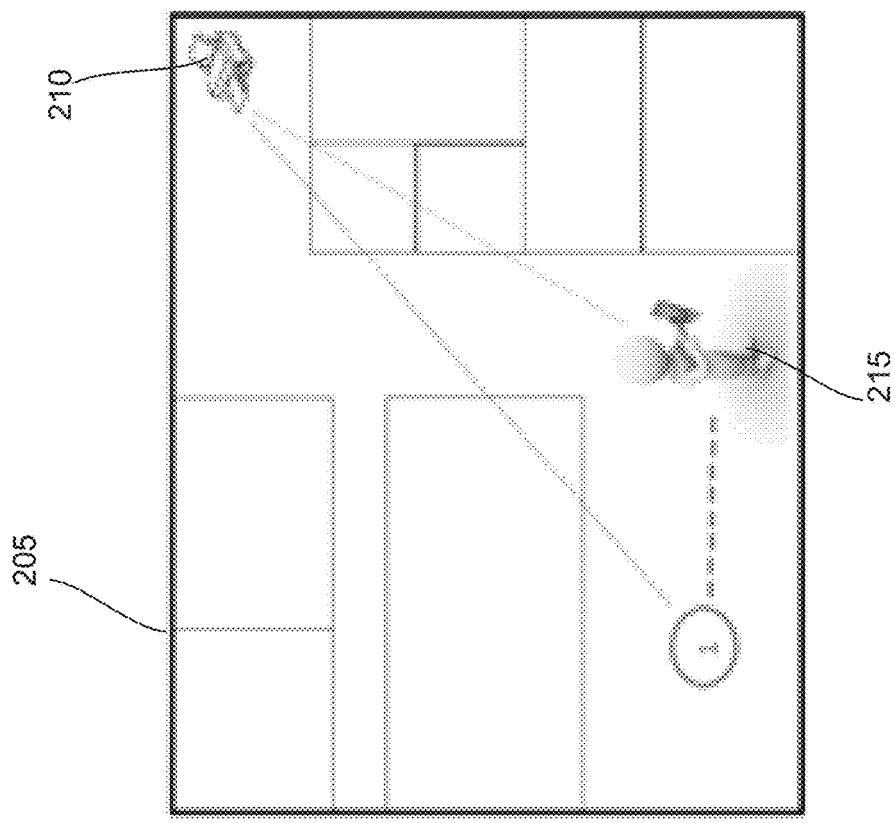
FIGS. 2A, 2B, and 2C pictorially illustrate a route to an asset according to at least one example embodiment.
Figure 2A:
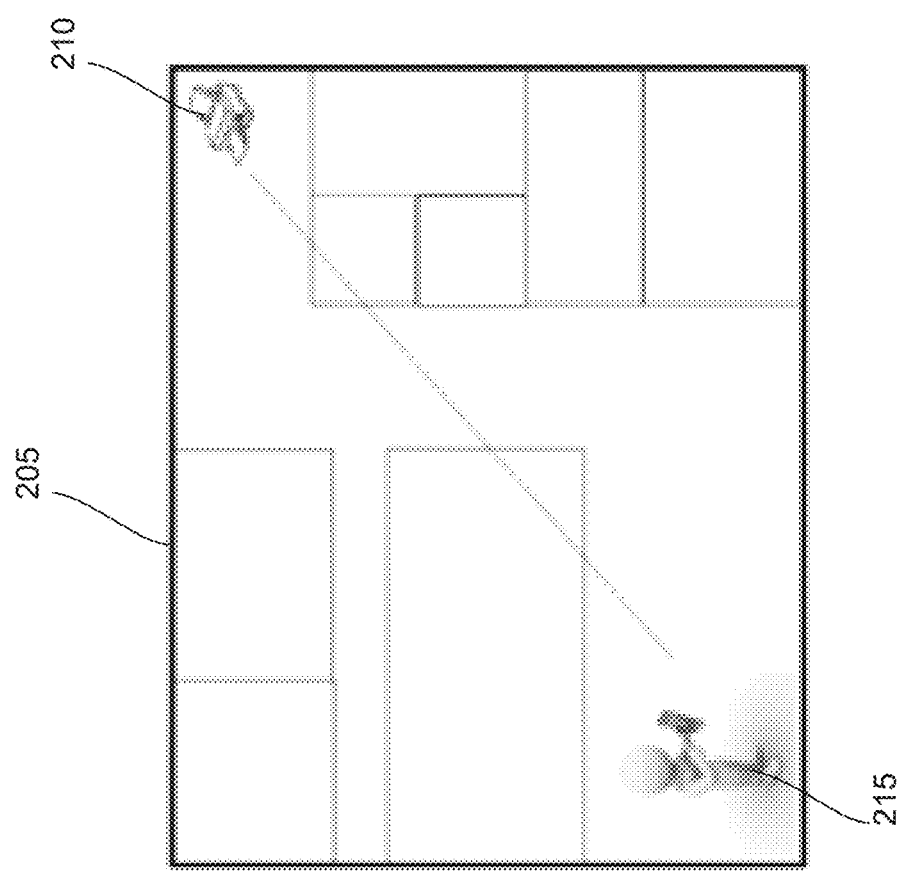
Figure 2C:
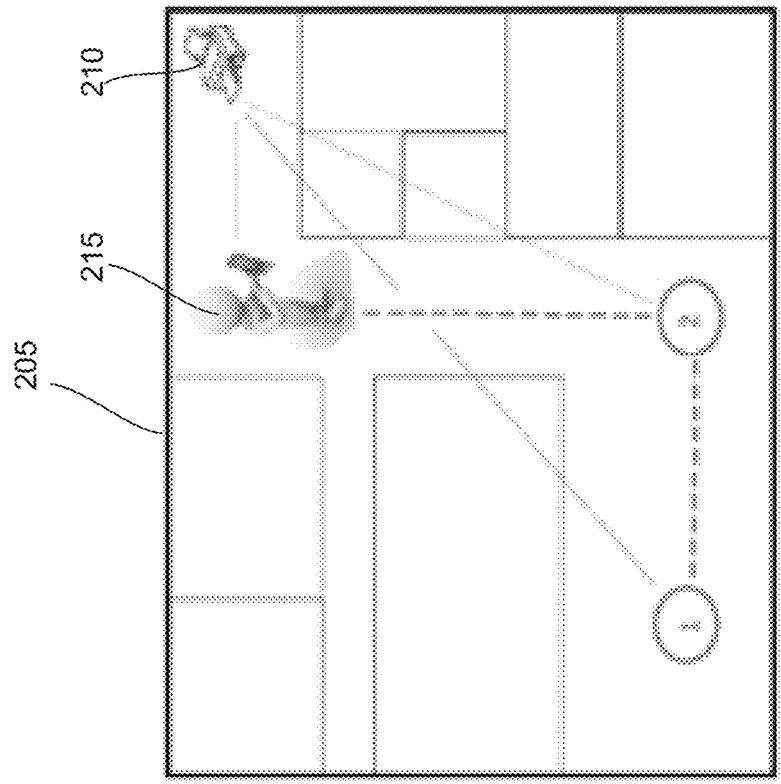

FIGS. 2A, 2B, and 2C pictorially illustrate a route to an asset according to at least one example embodiment. In an implementation, a floor map (e.g., the floor map 100) can be displayed on a computing device (e.g., mobile device, client device, smart phone, and/or the like) using an application. Using the application, a user can discover an asset 210 which is then shown on the floor map 205 (or a portion of the floor map 205). The user can then interact with the application to find a route to the asset 210. The user (shown as an avatar 215) can be at a first position as shown in FIG. 2A. A direct path from the first position to the asset 210 (shown as a straight line) is not possible. Therefore, the route directs the user to a second position (illustrated as a dotted line) as shown in FIG. 2B. A direct path from the second position to the asset 210 (shown as a straight line) is not possible. Therefore, the route directs the user to a third position (illustrated as a dotted line) as shown in FIG. 2C where the user has access to the asset 210. FIGS. 2A, 2B, and 2C pictorially illustrate the route to the asset as three screenshots. However, as single screenshot could be used.

Figure 3:
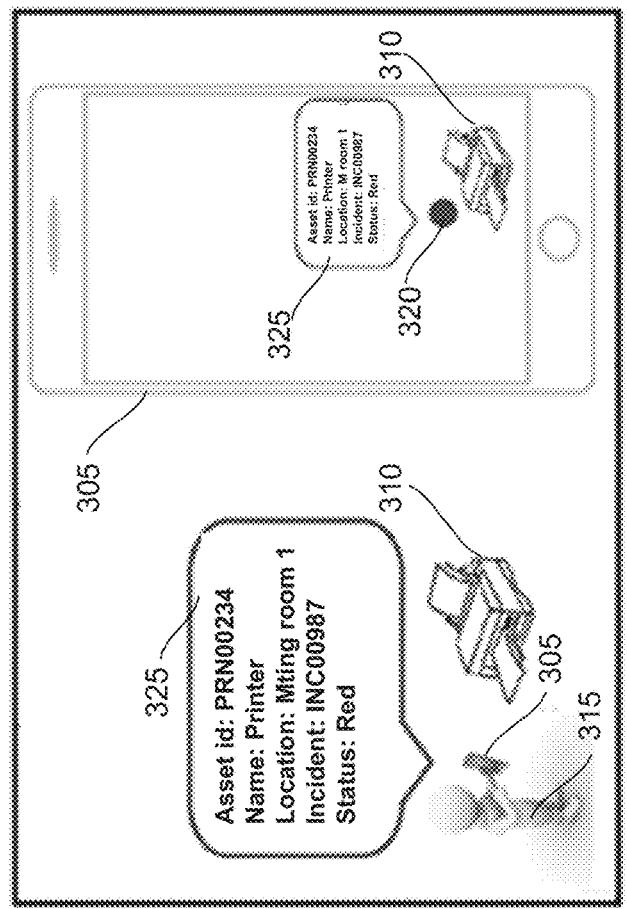
FIG. 3 pictorially illustrates a status and location of an asset according to at least one example embodiment.

FIG. 3 pictorially illustrates a status and location of an asset according to at least one example embodiment. As shown in FIG. 3, a user (shown as an avatar 315) is interacting with a computing device 305 executing an application showing an asset 310. The asset 310 is illustrated as having an associated status indicator 320. The status indicator 320 can be configured to illustrate a status of the associated asset (e.g., red, yellow green as discussed above). The status indicator 320 is shown with a callout box 325 including text with status and other information about the asset 310. The status indicator 320 and the callow box 325 can be implemented together as an indicator. The callout box 325 can be shown automatically when the user zooms (pans) in on the asset 310. The callout box 325 can disappear automatically when the user zooms (pans) out from the asset 310. The callout box 325 can appear/disappear when the user performs some action on the asset 310 via the application.

Figure 4:
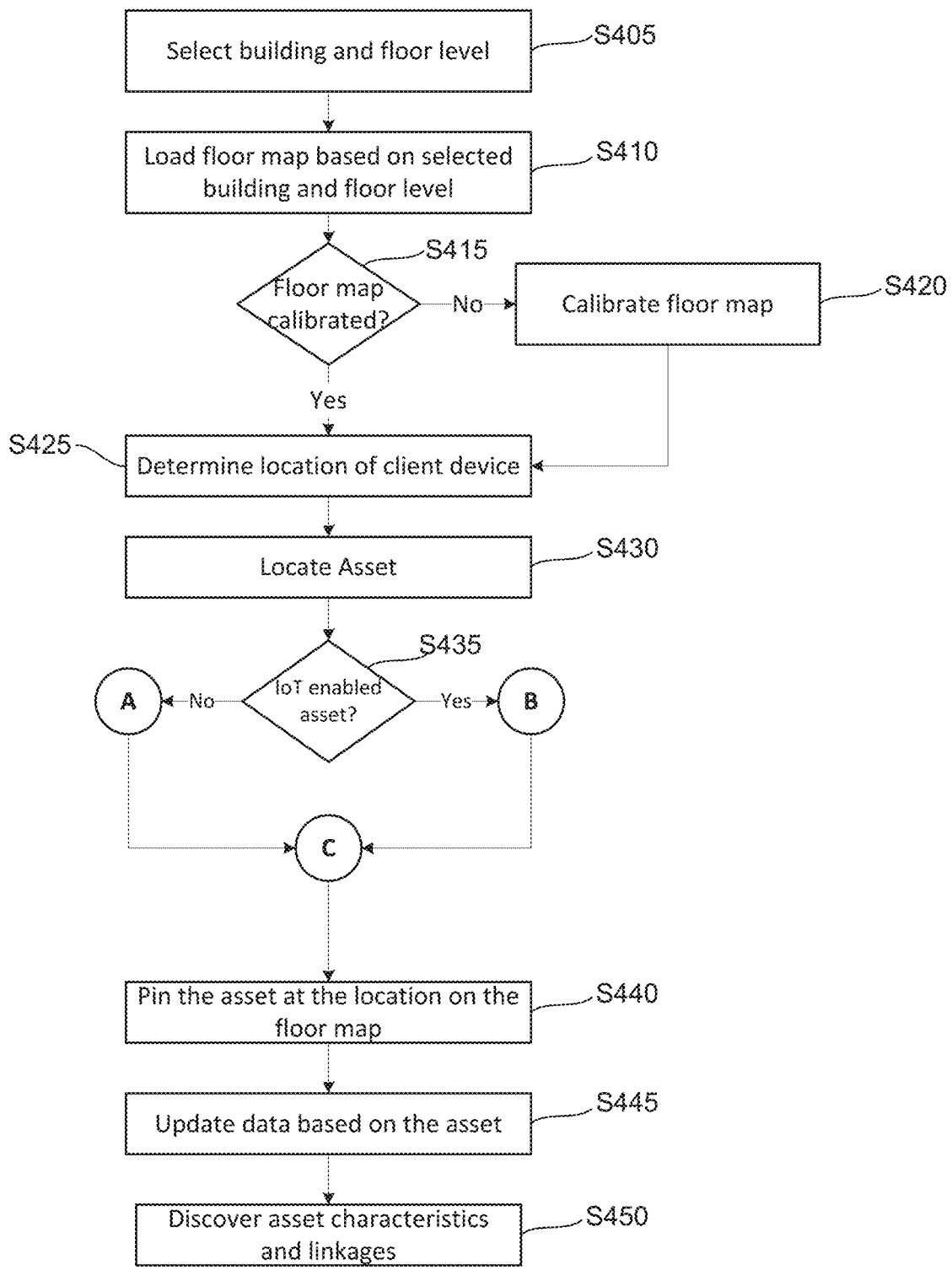
FIG. 4 illustrates a block diagram of a flowchart according to at least one example embodiment.
Figure 6:
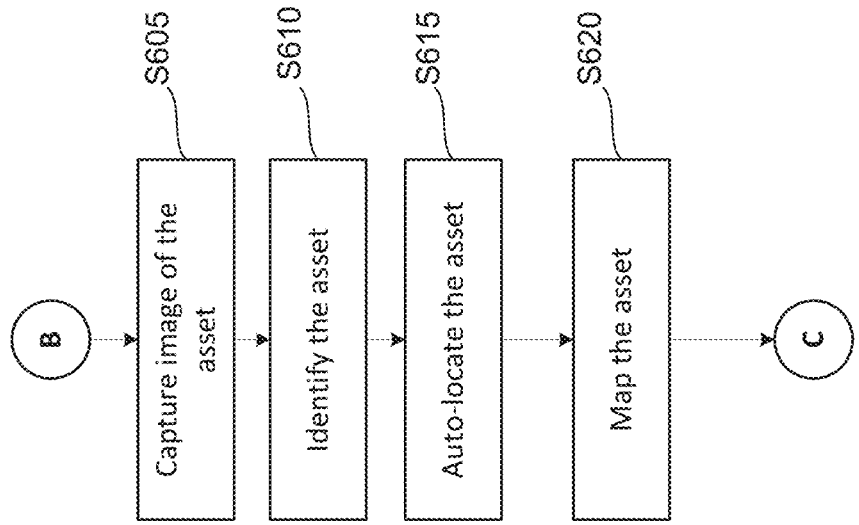
FIG. 6 illustrates another block diagram of a flowchart according to at least one example embodiment.
Figure 5:
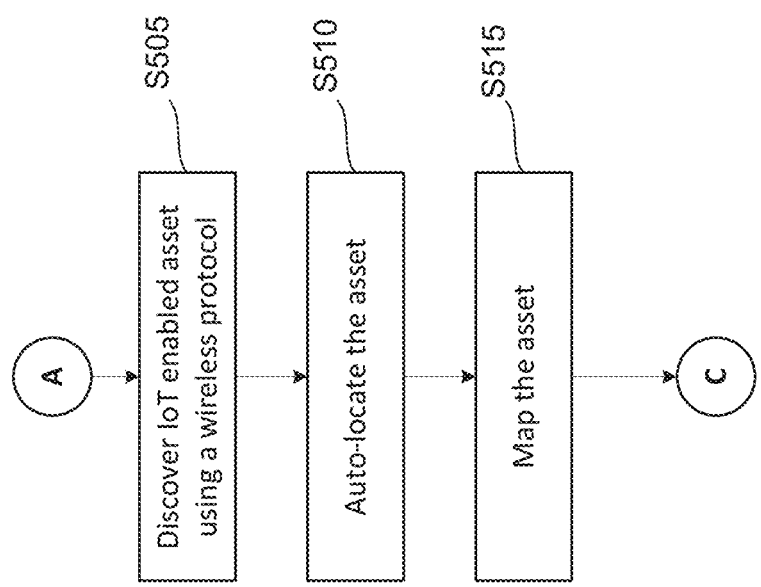
FIG. 5 illustrates another block diagram of a flowchart according to at least one example embodiment.
Figure 12:
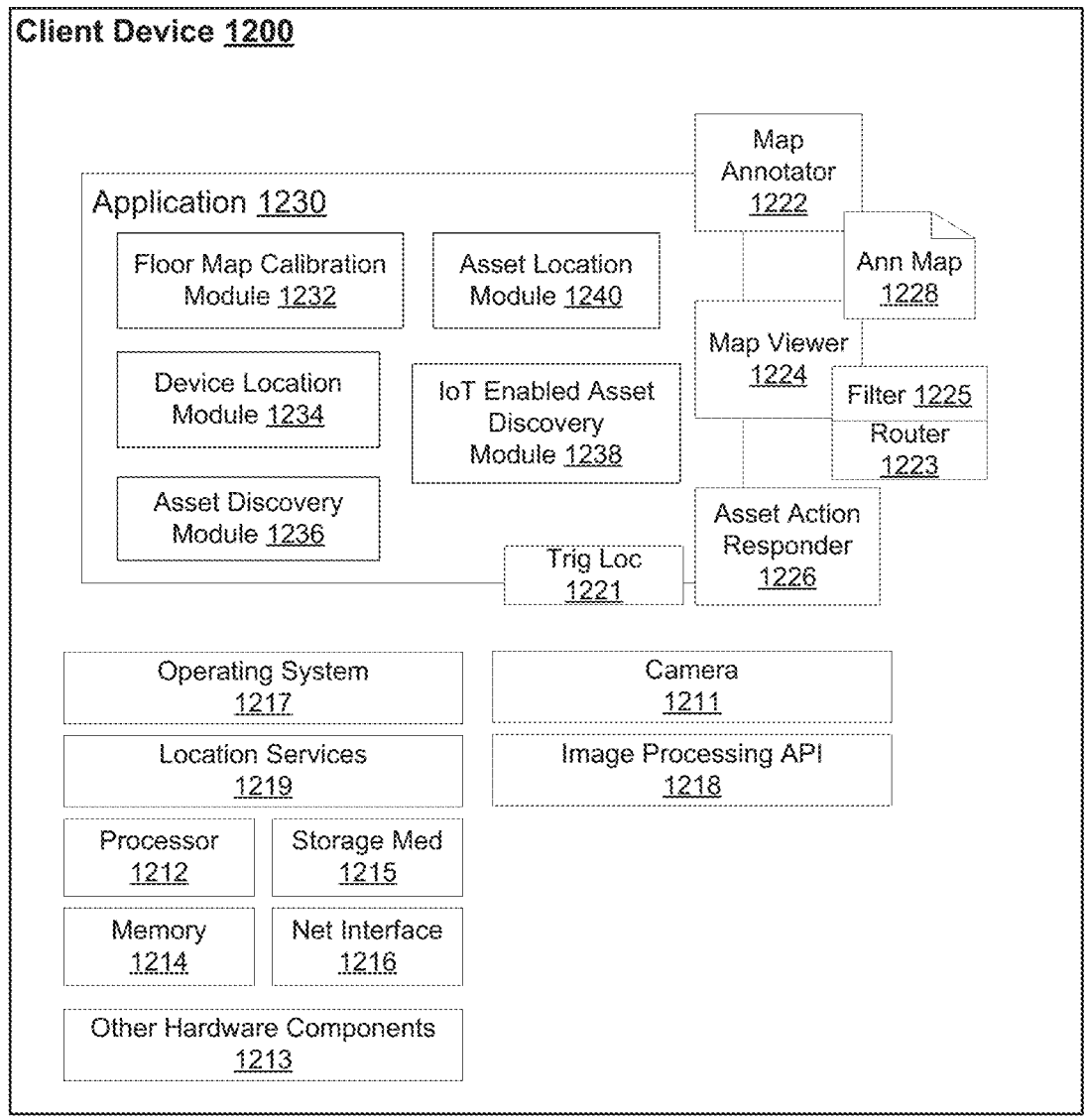
FIG. 12 illustrates a block diagram of a computing device according to at least one example embodiment.
Figure 13:
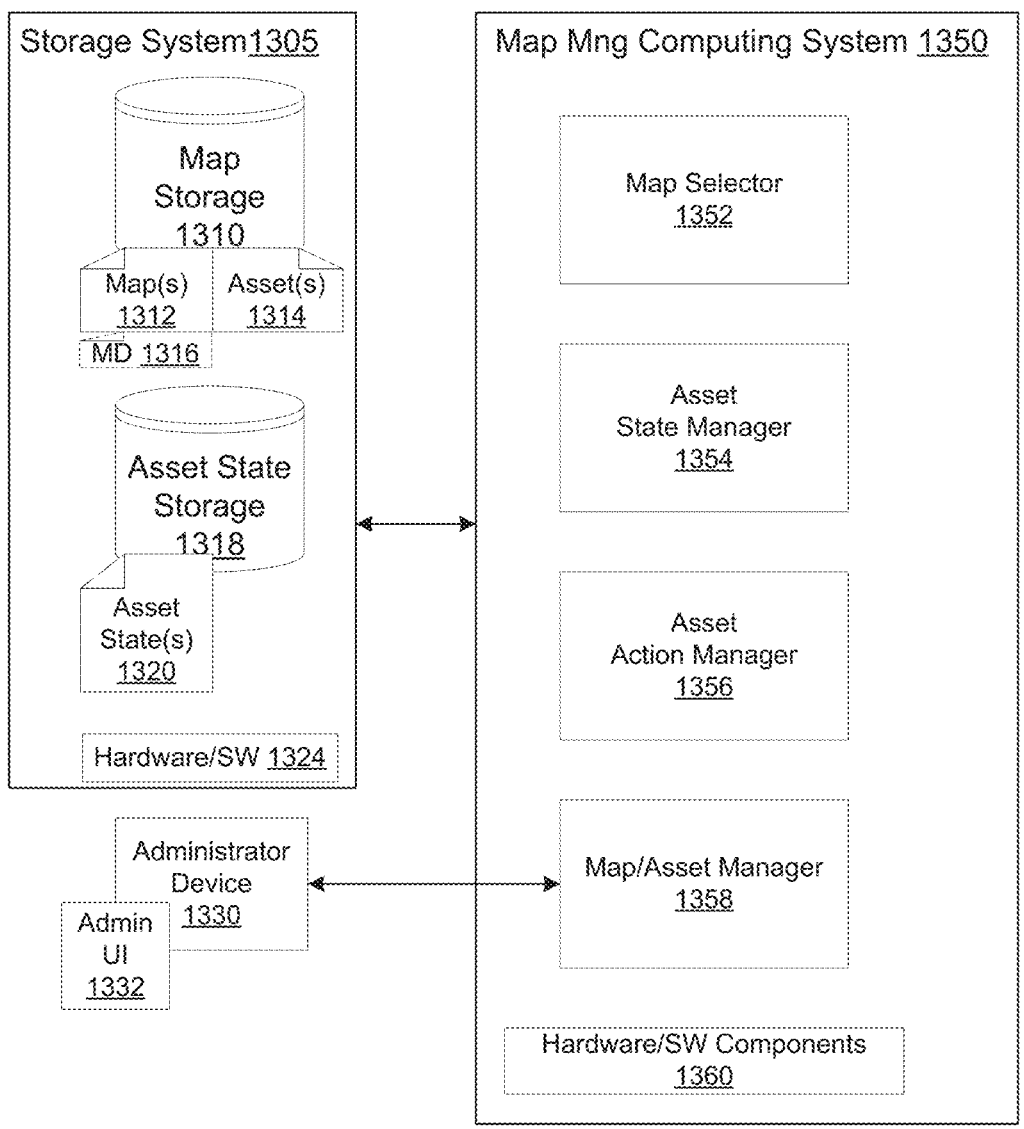
FIG. 13 illustrates a block diagram of another computing device according to at least one example embodiment.

FIGS. 4-6 are flowcharts of methods according to example embodiments. The steps described with regard to FIGS. 4-6 may be performed due to the execution of software code stored in a memory and/or a non-transitory computer readable medium (e.g., memory 1214) associated with an apparatus (e.g., as shown in FIGS. 12 and 13 (described below)) and executed by at least one processor (e.g., processor 1212) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 4-6.

FIG. 4 illustrates a block diagram of a flowchart according to at least one example embodiment. As shown in FIG. 4, in step S405 a building and floor level are selected. For example, a user can be interacting with a computing device executing an application configured to discover, identify and pin an asset as being located at a location on a floor map. In an initial operation on the application, the user can select a building and a floor in the building. In one implementation, the user can select the building based on a location of the device and/or through use of, for example, a dropdown list in the application. The floor can be selected, for example, using a dropdown list in the application. The dropdown list may include a floor(s) (e.g., a floor number) within the building.

In step S410 a floor map based on selected building and floor level is loaded. For example, the building and floor level (or a combination thereof) can have a unique value representing the building and floor level. The value could be the address of the building, a geo-positional value, an ID previously assigned, and the like and a number for the floor. The unique value can be communicated from the computing device executing the application to a computing device including a map management system (e.g., map or asset management computing system 1350). The map management system can then select a map as the floor map from a datastore (e.g., map storage 1310) including a plurality of maps at least a portion thereof each representing a floor map. The map management system can then communicate the floor map to the computing device executing the application in response to the user of the application loading the floor map. The application can then display the floor map on a display (e.g., within an active window) of the computing device executing the application.

Further, metadata representing at least one asset could be communicated from the map management system to the computing device executing the application with the floor map (e.g., in a same data packet or in a sequential (close in time) data packet). The metadata could include information about or related to the asset (e.g., status, type, serial number, and the like) and a location (e.g., coordinates) on the map representing the floor map. The floor map can then be annotated (e.g., overlaid) with the asset at the corresponding location on the floor map. In other words, the map management system can generate an annotated floor map based on the asset and the information (e.g., status, type, serial number, location and the like) related to the asset If the floor map is calibrated (yes in step S415), processing continues to step S425. If the floor map is not calibrated (no in step S415), processing continues to step S420. In an example implementation, the floor map can be identified as not calibrated the first time the floorplan is loaded into an application (by the user or by any other user). In another implementation, the floor map includes metadata (e.g., communicated from the map management system to the computing device executing the application with the floor map) indicating the map has or has not been calibrated.

In step S420 the floor map is calibrated. For example, the calibration operation can include walking a location (e.g., a floor of a building) with the application operating on the computing device. The application can be in a calibration mode configured to capture data. The captured data can be signal strength data or information representing a signal field for at least one position (e.g., coordinate) on the floor map. Using the captured data, the application can generate a table of coordinates on the map and a corresponding unique identifier (or signature or footprint or fingerprint of that position). For example, depending on the technique used, the identifier can be a magnetic field footprint (sometimes called a fingerprint) or a WIFI signal footprint (sometimes called a fingerprint) captured using a WIFI Indoor Positioning protocol.

Figure 7:
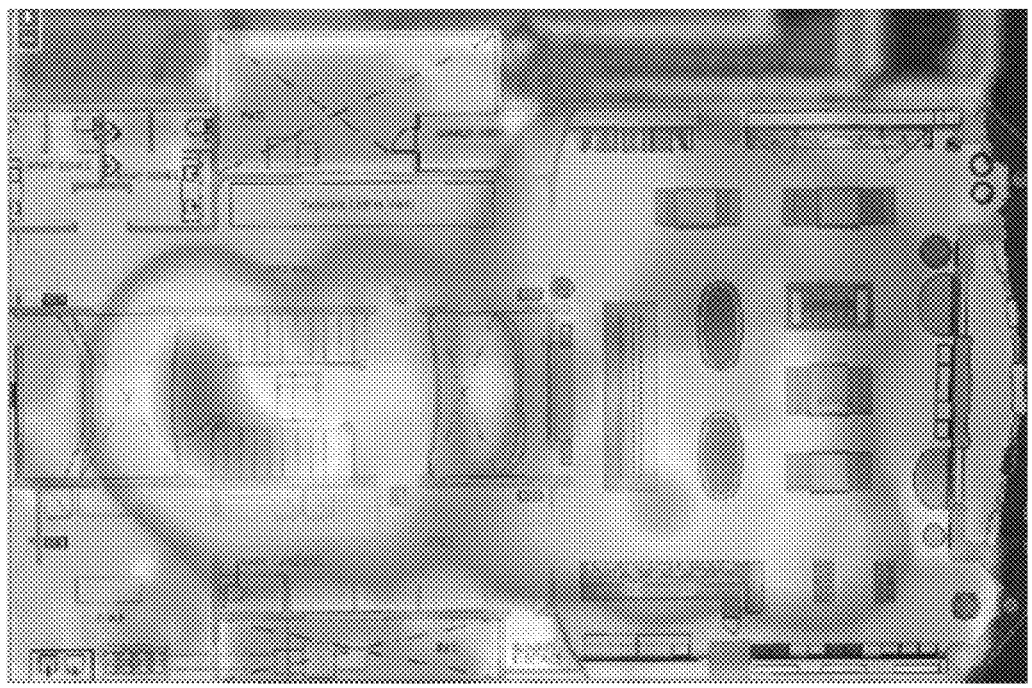
FIGS. 7 and 8 illustrate a magnetic fingerprint of a floor map according to at least one example embodiment.
Figure 8:
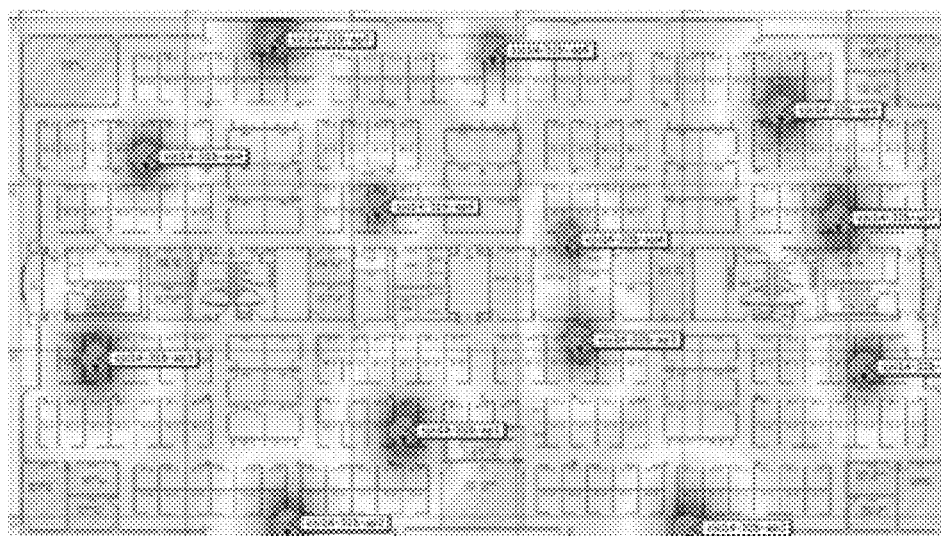

Magnetic indoor positioning is based on buildings or structures each have a unique magnetic signature or fingerprint. For example, the steel structure within the building distorts the Earth's magnetic field in a unique way. In an example implementation, the user (e.g., of the aforementioned application) can calibrate the map by marking a path on the map and then walking the same path in a calibration mode selected in the application. The application then captures the magnetic field fingerprint (e.g., using a Magnetic Indoor Positioning protocol) readings along the path and builds the database of fingerprints as related to coordinates within the location. The more that training paths and rescans (e.g., using crowd-sourcing, the better the accuracy of this technique. An example implementation can use extrapolation logic to generate missing fingerprints for the remaining (or unmeasured) coordinates. FIG. 7 and FIG. 8 illustrate examples of magnetic fingerprint as related to coordinates within the location.

In an example implementation, the floor map is calibrated for use in determining or calculating a distance. For example, signals (e.g., associated with NFC Bluetooth, BLE, WIFI, and/or the like) can be attenuated (e.g., power loss) or otherwise distorted by structures (e.g., walls) or objects (e.g., desks, assets, and the like). Therefore, calibration allows the determining or calculating of a distance to take into account the attenuation and/or distortion of the signals. In an example implementation, the calibrated footprint can have accuracy in the range of 2 to 4 meters.

In step S425 a location of client device is determined. In an example implementation, to identify the location of a user e.g., IT personnel, application user, and the like) of the computing device executing the application on the floor map, an Indoor Positioning System (IPS) technique (e.g., Magnetic Indoor Positioning, WIFI Indoor Positioning, and/or the like) can be used. The user (e.g., as an avatar 215, 315) can be shown in the application on the floor map. The user can be shown in the application in different positions on the floor map as the user moves around the building floor. Showing the user on the floor map may give the user of the application a sense of where the user is relative to other elements (e.g., assets hallways, office rooms, and the like) displayed in association with the map.

In step S430 an asset is located. For example, as the user moves around the building floor, the user can visually identify an asset that is not shown (or a different asset than what is shown). In another example, an asset can be detected based on a communications protocol signal (e.g., NFC, Bluetooth, BLE, WIFI, and/or the like) transmitted from a device (e.g., a smart device and/or an IoT enabled device).

If the asset is IoT enabled, also referred to as a smart device, (yes in step S435), processing continues to node B which continues with FIG. 6 described below. If the asset is not IoT enabled, also referred to as not a smart device, (no in step S435), processing continues to node A which continues with FIG. 5 described below. Processing returns from node A and node B at node C.

In step S440 the asset is pinned at the location on the floor map. For example, metadata including information associated with the IoT enabled device (or smart device) identified as an asset (see the discussion of FIG. 5 below) or the not IoT enabled device (or non-smart device/asset) identified as an asset (see the discussion of FIG. 6 below) that has been placed or pinned to a position on the floor map corresponding to the auto-located position in the application can be communicated from the computing device executing the application to the computing device including the map management system. The metadata can include information that identifies the asset (e.g., Name, ID, MAC Address, IP Address, and the like) ascertained during discovery of the IoT enabled device (or non-smart device/asset) and/or asset identification of the not IoT enabled device (or non-smart device/asset). The metadata can include information related to the location of the asset (e.g., coordinates on the floorplan or corresponding map) ascertained during the auto-locate process implemented for the asset.

In step S445 data is updated based on the asset. For example, the metadata can be processed by the map management system and stored in the datastore (e.g., map storage 1310) as an asset (e.g., asset 1314). The map management system can be a configuration management database (CMDB) including assets identified as configuration items (CI). Using the information that identifies the asset, the map management system (or CMDB) can determine if matching asset(s) (as a CI) exist in the datastore. Should a new asset be discovered, the map management system can create a new record (e.g., new CI record). Should the asset exist (e.g., a matching CI, ID, serial number, and/or the like is found), the map management system can update an existing record (e.g., CI record) using a reconciliation process in the map management system (or CMDB). In other words, the received metadata for the asset can be used to update the record for the asset (e.g., asset 1314 and/or asset state 1320) with regard to a location, a status, a MAC Address, an IP Address, and/or the like for the asset in the datastore (e.g., map storage 1310 and/or asset state storage 1318).

In step S450 asset characteristics and linkages are discovered. For example, map management system and/or other IT systems can include information about an asset and/or a type of asset. Characteristics of the asset (e.g., possible asset states, possible asset actions, operating procedures, error logs, maintenance logs, and/or the like) can be retrieved from or linked to the map management system and/or other IT systems and stored in relation to the asset, for example, in the record for the asset (e.g., asset 1314). Further, linkages (e.g., a joined table) can be discovered (e.g., an ID for the asset in another datastore or the joined table) and stored. For example, the ID for the asset discovered as existing in another can be added (in an appropriate field) in the record for the asset (e.g., asset 1314) to create the linkage via a joined table.

Using this set of steps, system will be able to auto-generate an asset floor plan much more intuitively than any other existing/known application. End Users can also follow the same flow to discover more assets or detect changes in asset locations and keep the asset floor plan as real-time as possible.

Example embodiments can use two techniques for identifying and pinning various assets on the map. In a first technique the asset is an IoT enabled device, the asset can be discovered using IoT protocols (e.g., NFC, Bluetooth, BLE, WIFI, and/or the like). IoT enabled devices or assets can include printers, laptops, mobile phones, monitors, smart TVs, projectors, hard disks, network access points, and/or the like. IoT enabled devices or assets can be configured to communicate wirelessly using wireless protocols. During a discovery process, at least one property (or properties) that identify the device (e.g., Name, ID, MAC Address, IP Address, and the like) can be communicated from the IoT enabled devices or assets to the computing device executing the application. In addition, channel frequency and signal strengths can be measured and/or determined and stored by the computing device executing the application.

FIG. 5 illustrates another block diagram of a flowchart according to at least one example embodiment. As shown in FIG. 5, in step S505 the IoT enabled asset is discovered using a wireless protocol. For example, as the user is in range of a signal communicated from the IoT enabled asset, the computing device executing the application can receive the signal and determine that the asset is an IoT enabled device. The computing device executing the application can then request the properties that identify the device (e.g., Name, ID, MAC Address, IP Address, and the like) from the IoT enabled device. The IoT enabled device communicates the properties that identify the IoT enabled device to the computing device executing the application. The application then stores (e.g., in a memory of the computing device) the properties that identify the IoT enabled device.

In step S510 the asset is auto-located. For example, initially, the IoT enabled device is scanned using various protocols including (but not limited to) WIFI, Bluetooth, and the like and channel Frequency (e.g., 2.4 GHz or 5 GHz) is captured along with the signal strength, for example, a Received Signal Strength Indicator (RSSI) in dBm (decibels per milliWatt). The signal strength is related to the distance and frequency. Therefore, it possible to find the distance based on above two readings using formula derived from free-space path loss (FSPL):

$$\text{Dist}(m) = (27.55 - (20\ \log_{10} F(\text{in MHz}) + |\text{Signal strength(in db)}|)/20 \quad (1)$$

The constants used in Equation 1 depend on the free space path (e.g., obstacles) and can be tuned (e.g., varied) depending on the environment (e.g., as determined in the initial calibration described above). Also, a dB value should be calculated from a dBm value. This gives the approximate circular range in which device would be located. For example, for a device transmitting a WIFI signal at 2.4 GHz frequency with RSSI of −27 dB would be located in a circle of approximately 7 meter radius.

Figure 9:
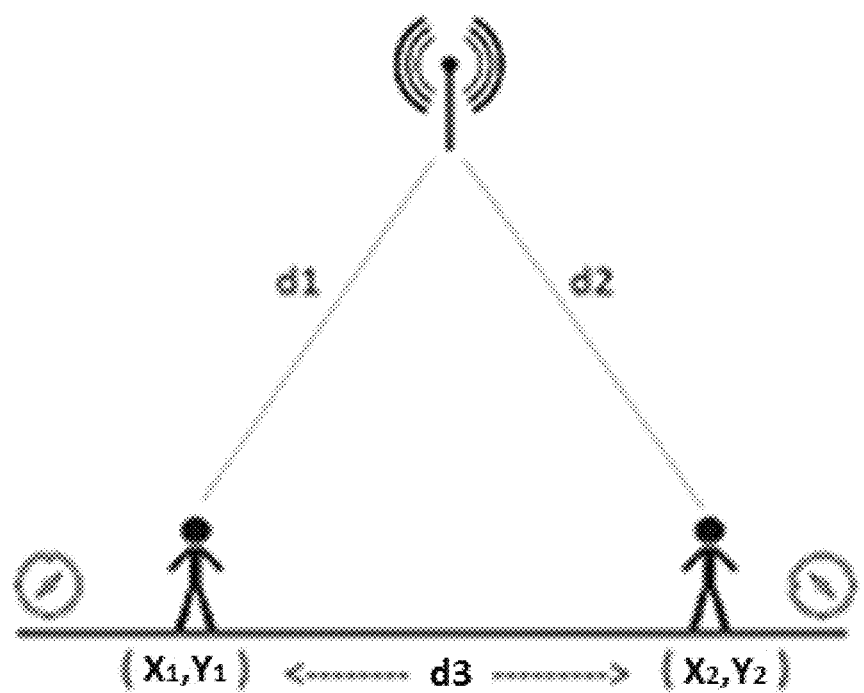
FIG. 9 illustrates trilateration of a device or asset according to at least one example embodiment.

In order to find a more precise location, readings can be measured as the user walks around the area. The application can store the change location of the computing device executing the application (e.g., using the IPS technique above) as well as new distance calculated based on changed RSSI reading. Using Trilateration as illustrated in FIG. 9, the exact (or a more precise) position of the IoT enabled device can be determined or calculated.

In step S515 the asset is mapped. For example, the IoT enabled device can be identified as an asset and the IoT enabled device can be placed or pinned to a position on the floor map corresponding to the auto-located position.

In a second technique for identifying and pinning various assets on the map, the assets not IoT enabled. For assets not IoT enabled (e.g., non-smart devices), example embodiments use a technique based on camera measurement and image processing APIs (e.g., vision API) to identify the asset.

FIG. 6 illustrates another block diagram of a flowchart according to at least one example embodiment. As shown in FIG. 6, in step S605 an image of the asset is captured. For example, the computing device executing the application can include a camera (e.g., camera 1211). The camera can be used to take a picture of the asset.

In step S610 the asset identified. For example, an asset class associated with the asset can be identified using machine learning (ML) and an image processing application programming interface (API). The image processing API can enable developers to understand the content of an image by encapsulating machine learning models in an easy to use representational state transfer (REST) API. The image processing API can classify images into thousands of categories (e.g., as a type of asset) and detect individual objects (e.g., text) within an image.

Machine learning classification can be used to identify an asset class from a set of given classes. Over time (e.g., through learning iterations), a set of features can be identified for given asset classes. Then using sufficient training data a ML model can be built. The ML model can then be used to classify objects in a captured image to one of the asset class.

Figure 11:
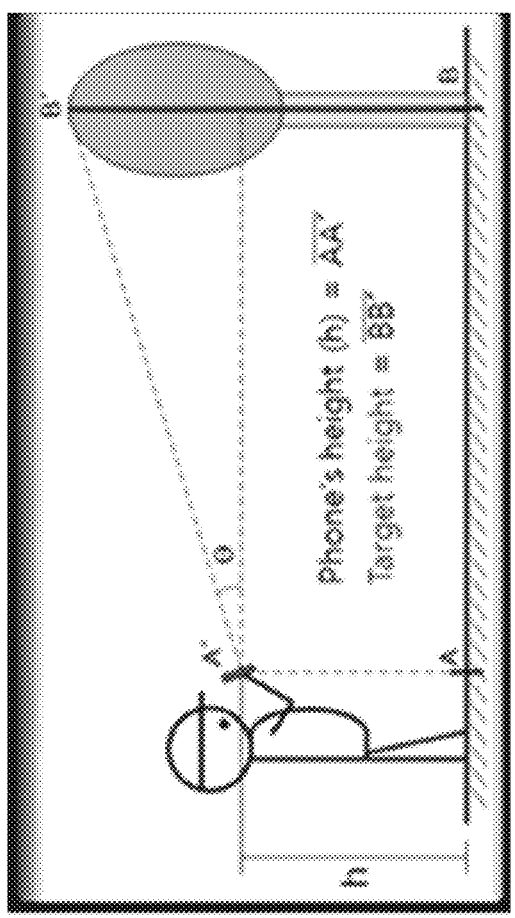
FIGS. 10 and 11 illustrate locating a position of a device or asset according to at least one example embodiment.
Figure 10:
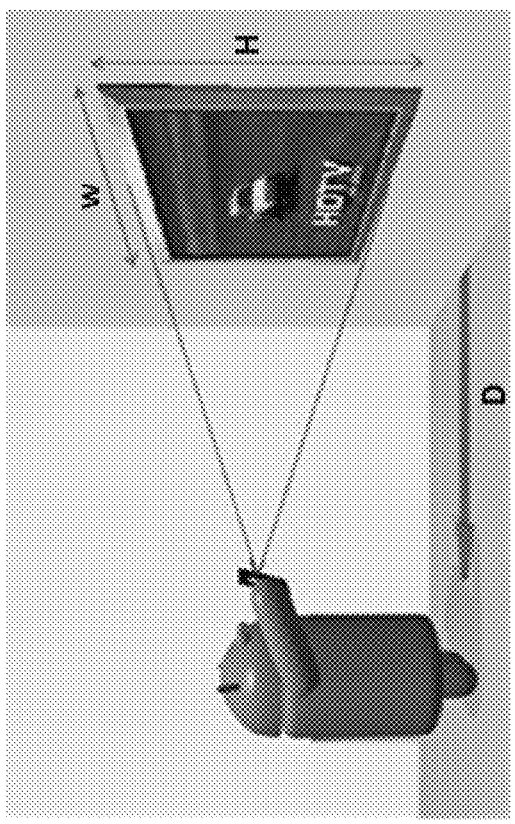

In step S615 the asset is auto-located. According to an example embodiment, in order to locate a position of assets not IoT enabled (or non-smart device) an angle of the computing device executing the application can be used to estimate the distance to a point on the ground. Other measurements like height, width can be used to improve accuracy. The computing device executing the application can be held in front of the user, align the point in the camera toward the asset and using the application get a direct reading of the distance. For example, the height of where the computing device executing the application is held (e.g., eye-level) can be determined, then the user can point the camera to the point where the asset touches the ground. Then the computing device executing the application can measure an inclination (e.g., based on the aforementioned angle) between at least two heights associated with the asset and use a trigonometric function and the inclination to determine a distance between the client device and the asset as illustrated in FIG. 10 and FIG. 11.

In step S620 the asset is mapped. For example, the asset can be identified as an asset and can be placed or pinned to a position on the floor map corresponding to the auto-located position.

FIG. 12 illustrates a block diagram of a computer device according to at least one example embodiment. As shown in FIG. 12, the computer device is a client device 1200. The client device 1200 can be a desktop, laptop, mobile phone, mobile device, workstation, personal digital assistant, smartphone, tablet, a virtual machine, a virtual computing device and/or the like. The client device 1200 can also be referred to as a user device an agent device, a client computing system, a user computing system, a device and/or the like. In various embodiments, the client device 1200 may be used by a user including IT personnel and/or general population (e.g., employees, managers and/or the like) authorized to have access to or use assets associated with an organization.

In various embodiments, the client device 1200 may include a processor 1212 configured to execute one or more machine executable instructions or pieces of software, firmware, or a combination thereof. The client device 1200 may include, in some embodiments, a memory 1214 configured to store one or more pieces of data, either temporarily, permanently, semi-permanently, or a combination thereof. Further, the memory 1214 may include volatile memory, non-volatile memory or a combination thereof. In various embodiments, the client device 1200 may include a storage medium 1215 configured to store data in a semi-permanent or substantially permanent form. In various embodiments, the storage medium 1215 may be included by the memory 1214. The memory 1214 and/or the storage medium 1215 may be referred to as and/or implemented as a non-transitory computer readable storage medium.

In various embodiments, the client device 1200 may include one or more network interfaces 1216 configured to allow the client device 1200 to be part of and communicate via a communications network. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. it is understood that the above are merely a few illustrative examples to which the disclosed subject matter is not limited.

In various embodiments, the client device 1200 may include one or more other hardware components 1213 (e.g., a display or monitor, a keyboard, a mouse, a camera, a fingerprint reader, a video processor, etc.). It is understood that the above are merely a few illustrative examples to which the disclosed subject matter is not limited.

In the illustrated embodiment, the client device 1200 may include one or more location services 1219. In one such embodiment, the location services 1219 may be configured to indicate where the client device 1200 is physically located within a certain amount of precision (often determined by the technology used for detecting the location). In various embodiments, this location service 1219 may include a Global Positioning System (GPS) receiver or detector. In another embodiment, the location service 1219 may include a control plane locator, such as, a device configured to determine the distance of the client device 1200 from one or more cell-phone (or other radio signal) towers or broadcasters. In another embodiment, the location service 1219 may be configured to estimate the client device's 1200 location based upon a time difference of arrival or other time-based technique. In yet another embodiment, the location service 1219 may be configured to estimate the user device's 102 location based upon a local-range (e.g., <30 meters, Bluetooth, wireless local area network (WLAN) signals, near field communication (NFC), radio-frequency identification (RFID) tags, etc.) signals or another form of a local position system (LYS). In various embodiments, the location service 1219 may be configured to make use of triangulation, trilateration, multilateration, or a combination thereof. In various embodiments, location service 1219 may be configured to make use of one or more of these examples either in combination or alone. It is understood that the above are merely a few illustrative examples to which the disclosed subject matter is not limited.

In various embodiments, the client device 1200 may include an operating system (OS) 1217 configured to provide one or more services to an application 1230 and manage or act as an intermediary between the application 1230 and the various hardware components (e.g., the processor 1212, a network interface 1216, etc.) of the client device 1200. In such an embodiment, the client device 1200 may include one or more native applications, which may be installed locally (e.g., within the storage medium 1315, etc.) and configured to be executed directly by the processor 1212 and directly interact with the OS 1217. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 1212.

In various embodiments, the user may be an Information Technology (IT) Field Support personnel (e.g., Technicians, Asset Managers, and the like), using the application 1230 to build a floor map by discovering, identifying and pinning an asset at appropriate location on a floor map. In various embodiments, the user may be travelling to a new environment or work place, although the illustrated embodiment would be just as valid for a location that the user frequents. It is understood that the below is merely one illustrative example to which the disclosed subject matter is not limited. In such an embodiment, the user may wish to see or be made aware of the various assets, physical resources, or points of interests (POIs) around the user in this location.

In this context, a floor plan, floor map, and/or map includes a map or data structure that may be interpreted as a geographic diagram of a given or associated location or route. The floor plan, floor map, and/or map can include a layout of a location (e.g., a floor of a building). In this context, an asset is a term used to describe both physical objects, such as, for example a copier, printer, fax machine, traveler's workstation or computer, etc. and/or locations, such as, for example, a conference room, desk, etc. In this context, the term asset may be used to both describe the object/location itself or a data structure that represents or is associated with the physical object/location itself and used to represent that physical object/location to a computing device (e.g., client device 1200) or a software application (e.g., application 1230).

However, while the examples described herein show and describe a floor of an office building, and assets that are typical of an office environment (e.g., printers, coffee machines, conference rooms, etc.), it is understood that such are merely a few illustrative examples to which the disclosed subject matter is not limited. In another embodiment, the floor map may include a diagram of a rack of servers in data center. In such an embodiment, the asset may include various server racks or particular server in a given rack. In another embodiment, the floor map may include a diagram of a computer network, and the asset may include various computing devices, access points, gateways, servers, and/or routers on the network. It is understood that the above are merely a few illustrative examples to which the disclosed subject matter is not limited.

In various embodiments, the application 1230 may be configured to display an annotated map 1228 to the user on a display or display interface of the client device 1200. The annotated map 1228 may include a floor map (e.g., map 1312) and be annotated with one or more asset (e.g., asset 1314) retrieved or received from a remote computing device (e.g., map or asset management computing system 1350). In an example implementation, the annotated map 1228 may include the floor map 100. In various embodiments, the floor map may show or describe the location of various structural features of a given location (e.g., a floor of an office building, etc.). In some embodiments, the structural features may include, but are not limited to, walls, doors, desks, furniture, sinks, toilets, elevators, plants, etc. In some embodiments, the floor map may be stored as images (e.g., a Joint Photographic Experts Group (jpeg) image, bitmap, scalable vector graphic, etc.) or as an array or other data structure that the displaying or manipulating application may read and display to the user as a human readable floor map. As described above, in the illustrated embodiment, the annotated map 1228 (e.g., as floor map 100) may include one or more assets (e.g., printer 115, etc.). As described above, the assets may include physical objects (e.g., printer 115, etc.), locations (e.g., conference room 105, etc.), or assets that are a combination of both (e.g., conference room 105 that includes a computer 125, etc.). In various embodiments, these assets may be received by the displaying or manipulating application as a data structure that is then interpreted and displayed to the user as a human readable indicator (e.g., icon, rectangle, etc.).

In the illustrated embodiment, the application 1230 may include a map annotator 1222. In one such an embodiment, the map annotator 1222 may be configured to take a selected map and annotate it with the selected assets and the asset metadata (e.g., type, state, actions, etc.). In one embodiment, the map annotator 1222 may generate or produce the annotated map 1228. In various embodiments, this annotated map 1228 may be similar to floor map 100.

In the illustrated embodiment, the application 1230 may include a map viewer 1224. In such an embodiment, the map viewer 1224 may be configured to display the annotated map 1228 to the user. In various embodiments, the map viewer 1224 may be configured to allow the user to select various assets, view the state information or metadata associated with the assets, zoom in or out of the annotated map 1228, display a route between two or more locations, select an action, etc. It is understood that the above are merely a few illustrative examples to which the disclosed subject matter is not limited.

In the illustrated embodiment, the map viewer 1224 may include a filter or search mechanism 1225. In such an embodiment, the user may be able to limit the assets displayed by the map viewer 1224 or included within the annotated map 1228 using a set of criteria supplied or selected by the user. For example, in one embodiment, the user may only wish to see assets of type printer. In such an embodiment, any assets not of type printer may be removed from the annotated map 1228 or simply not displayed by the map viewer 1224. In another embodiment, the filter 1225 may select or filter assets based on other properties or associated with an asset (e.g., free conference rooms, working copiers, assets associated with the Finance department, assets with a red state, etc.). It is understood that the above are merely a few illustrative examples to which the disclosed subject matter is not limited.

In the illustrated embodiment, the map viewer 1224 may include a router or path generating mechanism or component 1223. In such an embodiment, the router 1223 may be configured to generate or determine a route between two or more locations. In one embodiment, the router 1223 may determine a path between the current location of the client device 1200 and a selected or desired asset (e.g., asset 210). In some embodiments, this route or path may be graphical and displayed on the annotated map 1228 (as shown in FIGS. 2A, 2B and 2C. In another embodiment, the path may be described in text, graphics, audio directions, a combination thereof, or other forms. It is understood that the above are merely a few illustrative examples to which the disclosed subject matter is not limited.

In one embodiment, the application 1230 may include a asset action responder 1226. In various embodiments, the asset action responder 1226 may be configured to execute or request the execution of the steps or process defined by the selected action 167. In one embodiment, once the user 190 selects or takes an action, the asset action responder 1226 may determine if the action may be executed locally (by the client device 1200). For example, a user may wish to view a file, or place a telephone call, send an email, etc. If the information needed to execute the action is available locally or may be obtained via local resources (hardware or software), the asset action responder 1226 may execute or perform the requested action. For example, the requested file may be included in the metadata or may be obtainable via an HTTP request, the client device 1200 may include a phone and the desired number may be included in the metadata, likewise when sending an email, etc.

In some embodiments, the client device 1200 or application 1230 may have received one or more signals triggering location 1221. In such an embodiment, when the client device 1200 comes within a predefined range (e.g., 500 meters, 10 feet, 2 meters etc.) or within an area defined by the triggering location 1221, the application 1230 or client device 1200 may transmit its location information or a map request that includes the location information. It is understood that the above is merely one illustrative example to which the disclosed subject matter is not limited.

In some embodiments, the client device 1200 or application 1230 includes a floor map calibration module 1232. The floor map calibration module 1232 can be configured to store (or cause to be stored) calibration information. The calibration information can include information as to whether or not the floor map has been calibrated, calibration measurement data and/or calibration result data. The floor map can be identified as not calibrated the first time the floorplan is loaded into the application 1230 (by the user or by any other user). In another implementation, the floor map includes metadata (e.g., communicated from the map management system to the computing device executing the application with the floor map) indicating the map has or has not been calibrated.

For example, a calibration operation can include walking a location (e.g., a floor of a building) with the application 1230 operating on the client device 1200. The application 1230 can be in a calibration mode configured to capture data. Using the captured date, the floor map calibration module 1232 can generate a table of coordinates on the map and a corresponding unique identifier (or signature or footprint of that position). For example, depending on the technique used, the identifier can be a magnetic footprint or a WIFI signal footprint.

Magnetic indoor positioning is based on buildings or structures each have a unique magnetic signature or fingerprint. For example, the steel structure within the building distorts the Earth's magnetic field in a unique way. In an example implementation, the user (e.g., of the aforementioned application) can calibrate the map by marking a path on the map and then walking the same path in a calibration mode selected in the application. The application then captures the magnetic fingerprint readings along the path and builds the database of fingerprints as related to coordinates within the location. The more that training paths and rescans (e.g., using crowd-sourcing, the better the accuracy of this technique. There is also an extrapolation logic needed to generate missing fingerprints for the remaining coordinates. FIG. 7 and FIG. 8 illustrate examples of magnetic fingerprint as related to coordinates within the location.

In an example implementation, the floor map is calibrated for use in determining or calculating a distance. For example, signals (e.g., associated with NFC, Bluetooth, BLE, WIFI, and/or the like) can be attenuated (e.g., power loss) or otherwise distorted by structures walls) or objects (e.g., desks, assets, and the like). Therefore, calibration allows the determining or calculating of a distance to take into account the attenuation and/or distortion of the signals. In an example implementation, the calibrated footprint can have accuracy in the range of 2 to 4 meters.

In some embodiments, the client device 1200 or application 1230 includes a device location module 1234. The device location module 1234 can be configured to identify the location of the client device 1200. For example, an Indoor Positioning System (IPS) technique (e.g., Magnetic Indoor Positioning, WIFI Indoor Positioning, and/or the like) can be used.

In some embodiments, the client device 1200 or application 1230 includes an asset discovery module 1236. The asset discovery module 1236 can be configured to discover or detect an asset based on a signal (e.g., NFC, Bluetooth, BLE, WIFI, and/or the like) from a device (e.g., a smart device and/or an IoT enabled device). For example, as the client device 1200 comes in range (e.g., within 5 meters) of an asset, the asset discovery module 1236 can trigger an event indicating an asset (e.g., smart device or IoT enabled device) is close by.

In some embodiments, the client device 1200 or application 1230 includes an asset location module 1240. The asset location module 1240 can be configured to determine a location of the asset. For example an IoT enabled device (or smart device) can be scanned using various protocols including (but not limited to) WIFI, Bluetooth, and the like and channel Frequency (e.g., 2.4 GHz or 5 GHz) is captured along with the signal strength, for example, a Received Signal Strength Indicator (RSSI) in dBm (decibels per milliWatt). The signal strength is related to the distance and frequency. Therefore, it possible to find the distance based on above two readings using equation 1 as described above.

For example, to locate a not IoT enabled device (or non-smart device) asset location module 1240 can be configured to determine an angle of the client device 1200 to estimate the distance to a point on the ground. Other measurements like height, width can be used to improve accuracy. The computing device executing the application can be held in front of the user, align the point in a camera 1211 toward the asset and using the application get a direct reading of the distance. For example, the height of where the computing device executing the application is held (e.g., eye-level) can be determined, then the user can point the camera 1211 to the point where the asset touches the ground. Then the asset location module 1240 can measure an inclination and with simple trigonometry the can determine or calculate distance as illustrated in FIG. 10 and FIG. 11.

In some embodiments, the client device 1200 or application 1230 includes an IoT enabled asset discovery module 1238. The IoT enabled asset discovery module 1238 can be configured to discover properties that identify the IoT enabled device or asset. The IoT enabled asset discovery module 1238 can use a wireless protocol to discover the IoT enabled device or asset. For example, as the user is in range of a signal communicated from the IoT enabled device or asset, the client device 1200 can receive the signal and determine that the asset is an IoT enabled device. The IoT enabled asset discovery module 1238 can then request the properties that identify the IoT enabled device or asset (e.g., Name, ID, MAC Address, IP Address, and the like) from the IoT enabled device. The IoT enabled device communicates the properties that identify the IoT enabled device to the client device 1200. The IoT enabled asset discovery module 1238 then stores (e.g., in memory 1214) the properties that identify the IoT enabled device.

In some embodiments, the client device 1200 or application 1230 includes an image processing API 1218. The image processing API 1218 can be configured to utilize external tools to identify an object using a picture (or image) of the object. For example, can be identified using machine learning (ML) and implemented through the image processing API 1218. The external tools implemented through the image processing API 1218 can enable developers to understand the content of an image by encapsulating machine learning models in a representational state transfer (REST) API. The external tools implemented through the image processing API 1218 can classify images into thousands of categories and detect individual objects (e.g., text) within an image. The image processing API 1218 can be configured to communicate with the external tools using an internet (e.g., HTTP) protocol.

Machine learning (ML) classification can be used to identify an asset class from a set of given classes. Over time (e.g., through learning iterations), a set of features can be identified for given asset classes. Then using sufficient training data a ML model can be built. The ML model can then be used to classify objects in a captured image to one of the asset class.

FIG. 13 illustrates a block diagram of another computing device according to at least one example embodiment. In various embodiments, computing device may include a map or asset management computing system 1350, one or more storage computing devices or systems 1305 and an administrator device 1330. In one or more implementation, the map or asset management computing system 1350, the one or more storage computing devices or systems 1305 and the administrator device 1330 can operate in a single computing device (e.g., workstation, a server, a blade server, and other appropriate computers, etc. or a virtual machine or virtual computing device thereof), on separate computing devices, or any combination thereof.

In one embodiment, the map or asset management computing system 1350 may include a map selector 1352. In such an embodiment, the map selector 1352 may be configured to receive location information from the client device 1200. In one embodiment, the client device 1200 may supply or transmit the current location of the client device 1200 periodically or when a triggering event occurs (e.g., in response to a user request for a map or floor map, entering a predefined location, such as, one of the company's offices, etc.). In another embodiment, the client device 1200 may supply or transmit a request for a map or floor map of a specific location (e.g., abuilding and floor). In such an embodiment, the user may wish to pre-load the client device 1200 with one or more maps or floor maps of places the user is expecting to travel to; although, it is understood that the above is merely one illustrative example to which the disclosed subject matter is not limited. As described above, in various embodiments, this location information may include a list of GPS coordinates or other location coordinates or information.

In some embodiments, the map selector 1352 may be configured to select at least one map or floor map that is deemed relevant to the provided location information. In one embodiment, the map selector 1352 may be configured to pick or select a map or floor map that includes or bounds the provided location information. For example, if the client device 1200 is on the third floor of a building, the map selector 1352 may select the floor map of the third floor of that building. In another embodiment, the map selector 1352 may be configured to select at least one map or floor map near (as defined by a predefined set of criteria or rules) the supplied location information. For example, if the client device 1200 is on the third floor of a building, the map selector 1352 may select the floor maps of the second, third, and fourth floors of that building. In yet another embodiment, the map selector 1352 may be configured to remember a history of what map or floor map, etc. have previously been presented to the client device 1200. In various embodiments, the map selector 1352 may be configured to take into account user actions or predicted user actions when selecting a map or floor map. For example, if the client device 1200 is on the third floor of a building, and moving towards the elevators, the map selector 1352 may select the floor map of the second and fourth floors of that building. It is understood that the above are merely a few illustrative examples to which the disclosed subject matter is not limited.

In various embodiments, the map selector 1352 may be configured to retrieve any asset associated with the selected map or floor map. In some embodiments, the map selector 1352 may be configured to filter or only select a portion of the assets associated with the selected map or floor map. In one embodiment, the map selector 1352 may be configured to retrieve any metadata or properties associated with the selected map or floor map and the selected assets. In the illustrated embodiment, this metadata includes asset actions and asset states. It is understood that the above is merely one illustrative example to which the disclosed subject matter is not limited.

In such an embodiment, the map selector 1352 may be configured to transmit the selected map or floor map, the associated or selected assets, and the associated asset metadata to the client device 1200. In various embodiments, this information and other communications may be transmitted via Hypertext Transfer Protocol (HTTP), Hypertext Transfer Protocol Secure (HTTPS), or another communications protocol.

In various embodiments, the map or asset management computing system 1350 may include an asset state manager 1354. In one embodiment, the asset state manager 1354 may be configured to maintain state information associated with each asset. In such an embodiment, the asset state manager 1354 may receive state information from a plurality of sources, such as, for example the assets illustrated in FIG. 1, various client devices 1200, or administer devices 1330, etc. In one embodiment, when a printer detects a paper jam, the printer may be configured to send a message (e.g., email, tweet, HTTP message, etc.) to the asset state manager 1354 or a server to which the asset state manager 1354 subscribes (e.g., a Rich Site Summary or Really Simple Syndication (RSS) feed, etc.). The asset state manager 1354 may then edit or update the asset state 1320 associated with the printer to reflect the paper jam (e.g., a state of paper jam, unavailable, etc.).

In such an embodiment, as the asset state manager 1354 changes or at predefined periodic intervals or upon a request from the client device 1200, the client device 1200 may inform the application 1230 of the new or current state.

In the illustrated embodiment, the map or asset management computing system 1350 may include an asset action manager 1356. In such an embodiment, the asset action manager 1356 may be configured to execute or process an asset action request from a client device 1200. In various embodiments, the asset action manager 1356 may be configured to perform the request action (or portion thereof) itself, or to request that another device perform the action or part thereof.

In one embodiment, the asset action manager 1356 may be configured to change the state of the asset associated with the action. For example, the action may include that the user has cleared the paper jam in the printer, and the requested action may be to change the state or status of the printer to reflect that this manual portion of the action has been performed. In some embodiments, the asset action manager 1356 may work with or communicate with the asset state manager 1354 to perform such an action.

In the illustrated embodiment, map and asset information is transmitted for the administrator device 1330 to the map or asset management computing system 1350, and more specifically to the map and asset manager 1358. In such an embodiment, the map and asset manager 1358 may be configured to enter the map or PoI information supplied by the administrator device 1330 into the map storage 1310. In various embodiments, this may include re-formatting the map or asset information for storage as the maps 1312 and assets 1314. Likewise, in the illustrated embodiment, the map and asset manager 1358 may be configured to retrieve maps 1312 and assets 1314 requested by the administrator device 1330 from the storage system 1305 and supply the resultant map or asset information to the administrator device 1330. In such an embodiment, an administrator may edit, delete, or update various aspects of existing maps 1312 and assets 1314. However, in another embodiment, this map or asset information may be communicated directly between the storage system 1305 and the administrator device 1330.

In another example embodiment, map and asset information is transmitted from the client device 1200 to the map and asset manager 1358. In this way the steps described above with regard to FIGS. 4, 5 and 6 can be implemented to discover a new asset and to update an existing asset. The map and asset information can include asset locations and information that identifies the asset.

In various embodiments, the map or asset management computing system 1350 may include hardware and/or software components 1360 analogous to those described above in reference to client device 1200. In some embodiments, the map or asset management computing system 1350 may include a plurality of computing devices.

In various embodiments, the storage system 1305 may include a computing device, such as, for example, a desktop, workstation, a server, a blade server, and other appropriate computers, etc. or a virtual machine or virtual computing device thereof. In various embodiments, the storage system 1305 may include hardware and/or software components 1324 analogous to those described above in reference to client device 1200. In some embodiments, the storage system 1305 may include a plurality of computing devices.

In various embodiments, the storage system 1305 may include one or more storage systems or data bases 1310 and 1318. In some embodiments, the storage system 1305 may include a map and asset storage or database 1310. In such an embodiment, the map storage 1310 may store one or more maps or floor maps 1312 and one or more assets 1314.

In some embodiments, the storage system 1305 may include an asset state storage or database 1318. In such an embodiment, the asset state storage or database 1318 may include one or more asset states 1320. In various embodiments, each stored asset state 1320 may be associated with a respective asset 1314. In one embodiment, the data structure associated with the asset 1314 may be associated with or include an asset state 1320 property or field that indicates the status or usability of the associated asset 1314. In one embodiment, the asset 1314 may inherit one or more acceptable states based on the asset type. In another embodiment, the administrator may set or define a list of possible states the asset 1314 may be in. In the illustrated embodiment, the asset states 1320 include the actual state of the asset 1314 at a given moment. In such an embodiment, the application 1230 may display the current state of a given asset 1314 on the annotated map 1228, as described below.

In the illustrated embodiment, the administer may use the administrator user interface (UI) or application 1332 to import (and the edit or maintain, etc.) graphic images or data structures that represent floor maps into the map and asset storage or database 1310. In various embodiments, the floor maps 1312 may include data that includes a description of the floor map (e.g., "Building H, Floor 2", "Winnipeg Office, Ground Floor", etc.), and a geographical location or coordinates where the associated physical floor exists. In various embodiments, other information may be included. In some embodiments, such information may not be stored within the floor map 1312 itself, but in a separate format as floor map metadata 1316. In one embodiment, the information may be stored in a variety of formats (e.g., as part of the floor map's 1312 filename, as part of a metadata tag include by the floor map, as a separate file, etc.). In various embodiments, the floor map metadata 1316 and the floor map 1312 may be stored in a variety of formats, such as for example a text-based file (e.g., Extensible Markup Language (XML), JavaScript Object Notation (JSON), Comma-separated values (CSV), etc.), a binary-based format (e.g., zip compression format, JPEG, a serialized object-oriented data structure or object, etc.), or a combination thereof. It is understood that the above are merely a few illustrative examples to which the disclosed subject matter is not limited.

In the illustrated embodiment, the administrator may use the administrator user interface (UI) or application 1332 to import (and the edit or maintain, etc.) one or more assets 1314 to the map and asset storage or database 1310. In some embodiments, the administrator UI or application 1332 may be configured to allow or facilitate the ability for an administrator to place assets 1314 on the map 1312 via a graphical paradigm, similar to placing items via a drawing program.

In another example embodiment, map and asset information is transmitted from the client device 1200 to the map and asset manager 1358. In this way the steps described above with regard to FIGS. 4, 5 and 6 can be implemented to discover a new asset and to update an existing asset. The map and asset information can include asset locations and information that identifies the asset.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory computer readable storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    receiving a floor map indicating a layout of building features on a building floor;
    determining whether the received floor map is calibrated for use in determining or calculating a distance based on metadata, and, if the received floor map is determined to be uncalibrated based on the metadata, calibrating the floor map by:
        marking a path on the floor map and capturing magnetic field fingerprints of the building features along the path using a Magnetic Indoor Positioning protocol,
        constructing a database of the magnetic field fingerprints at co-ordinates on the floor map,
        improving an accuracy of the magnetic field fingerprints at the co-ordinates on the floor map using rescans, and
        updating the database of the magnetic field fingerprints at updated co-ordinates on the floor map based on the rescans;
    determining a position of a client device on the floor;
    identifying an asset on the floor;
    determining at least one characteristic that identifies the asset using at least one of:
        a discovery process using a wireless protocol, and
        an image processing application configured to classify and detect the asset within the image; and
    displaying the calibrated floor map showing a location of the asset on the floor, the at least one characteristic, and the position of the client device on the floor.

2. The method of claim 1, further comprising:
using the magnetic field fingerprints to account for attenuation of communication signals used in determining the location of the asset and the position of the client device on the floor.

3. The method of claim 1, wherein calibrating the floor map is based on a WIFI signal footprint captured using a WIFI Indoor Positioning protocol.

4. The method of claim 1, wherein
the asset is a smart device, and
the identifying of the asset includes detecting a communications protocol signal transmitted from the asset.

5. The method of claim 1, wherein
the asset is a smart device, and
the determining of at least one characteristic that identifies the asset includes determining a position of the asset on the floor map including:
  determining a position of the client device on the floor map using an Indoor Positioning System (IPS) protocol,
  measuring a channel frequency and a signal strength using the wireless protocol, and
  using a formula based on a free-space path loss (FSPL), the channel frequency and the signal strength to determine a distance between the client device and the asset.

6. The method of claim 1, wherein
the asset is not a smart device, and
the identifying of the asset includes:
  capturing an image of the asset,
  using the image processing application to communicate the image to an external tool configured to identify an object using the image, and
  receive an asset class associated with the asset from the external tool.

7. The method of claim 1, wherein
the asset is not a smart device, and
the determining of at least one characteristic that identifies the asset includes determining a position of the asset on the floor map including:
  determining a position of the client device on the floor map using an Indoor Positioning System (IPS) protocol, and
  measuring an inclination between at least two heights associated with the asset and use a trigonometric function and the inclination to determine a distance between the client device and the asset.

8. A non-transitory computer readable storage medium including executable code that, when executed by a processor, is configured to cause the processor to:
receive a floor map of a floor indicating a layout of building features on a building floor;
determine whether the received floor map is calibrated for use in determining or calculating a distance based on metadata, and, if the received floor map is determined to be uncalibrated based on the metadata, calibrate the floor map by:
  marking a path on the floor map and capturing magnetic field fingerprints of the building features along the path using a Magnetic Indoor Positioning protocol,
  constructing a database of the magnetic field fingerprints at co-ordinates on the floor map,
  improving an accuracy of the magnetic field fingerprints at the co-ordinates on the floor map using rescans, and
  updating the database of the magnetic field fingerprints at updated co-ordinates on the floor map based on the rescans;
determine a position of a client device on the floor;
identify an asset on the floor;
determine at least one characteristic that identifies the asset using at least one of:
  a discovery process using a wireless protocol, and
  an image processing application configured to classify and detect the asset within an image; and
display the calibrated floor map showing a location of the asset on the floor, the at least one characteristic, and the position of the client device on the floor.

9. The non-transitory computer readable storage medium of claim 8, further comprising:
using the magnetic field fingerprints to account for attenuation of communication signals used in determining the location of the asset and the position of the client device on the floor.

10. The non-transitory computer readable storage medium of claim 8, wherein calibrating the floor map is based on a WIFI signal footprint captured using a captured using a WIFI Indoor Positioning protocol.

11. The non-transitory computer readable storage medium of claim 8, wherein
the asset is a smart device, and
the identifying of the asset includes detecting a communications protocol signal transmitted from the asset.

12. The non-transitory computer readable storage medium of claim 8, wherein
the asset is a smart device, and
the determining of at least one characteristic that identifies the asset includes determining a position of the asset on the floor map including:
  determining a position of the client device on the floor map using an Indoor Positioning System (IPS) protocol,
  measuring a channel frequency and a signal strength using the wireless protocol, and
  using a formula based on a free-space path loss (FSPL), the channel frequency and the signal strength to determine a distance between the client device and the asset.

13. The non-transitory computer readable storage medium of claim 8, wherein
the asset is not a smart device, and
the identifying of the asset includes:
  capturing an image of the asset,
  using the image processing application to communicate the image to an external tool configured to identify an object using the image, and
  receive an asset class associated with the asset from the external tool.

14. The non-transitory computer readable storage medium of claim 8, wherein
the asset is not a smart device, and
the determining of at least one characteristic that identifies the asset includes determining a position of the asset on the floor map including:
  determining a position of the client device on the floor map using an Indoor Positioning System (IPS) protocol, and
  measuring an inclination between at least two heights associated with the asset and use a trigonometric function and the inclination to determine a distance between the client device and the asset.

15. A method comprising:
receiving, from a client device, a request for a floor map indicating a layout of building features on a building floor;
in response to receiving the request for the floor map, selecting the floor map from a database storing a plurality of maps;
communicating the floor map to the client device;
determining whether the received floor map is calibrated based on metadata and, if the received floor map is determined to be uncalibrated based on the metadata, calibrating the floor map by:
　marking a path on the floor map and capturing magnetic field fingerprints of the building features along the path using a Magnetic Indoor Positioning protocol,
　constructing a database of the magnetic field fingerprints at co-ordinates on the floor map,
　improving an accuracy of the magnetic field fingerprints at the co-ordinates on the floor map using rescans, and
　updating the database of the magnetic field fingerprints at updated co-ordinates on the floor map based on the rescans;
identifying an asset on the floor;
determining at least one characteristic that identifies the asset using one of:
　a discovery process using a wireless protocol, and
　an image processing application configured to classify and detect the asset within an image;
generating an annotated floor map showing a location of the asset, the at least one characteristic, and a position of the client device on the floor; and
communicating the annotated floor map to the client device.

16. The method of claim 15, wherein
the annotated floor map includes an icon representing the asset and an indicator,
the icon representing the asset is located on the floor map at the position of the asset; and
the indicator is located on the floor map at the position of the asset and indicates at least one of a type of the asset and a status of the asset.

17. The method of claim 15, further comprising:
discovering linkages to characteristics of the asset, and
adding the linkages for the asset to the database configured to store data related to the plurality of assets.

18. The method of claim 15, wherein the update of the database configured to store data related to the plurality of assets includes one of:
determining whether a record associated with the asset exists;
upon determining a record associated with the asset exists, update the record using the information related to the asset; and
upon determining a record associated with the asset does not exist, generate a new record using the information related to the asset.

* * * * *